(12) United States Patent
Mahdi et al.

(10) Patent No.: US 10,687,054 B2
(45) Date of Patent: Jun. 16, 2020

(54) DECOUPLED PREDICTION AND CODING STRUCTURE FOR VIDEO ENCODING

(71) Applicant: Intel Corporation, Santa Clara, CA (US)

(72) Inventors: Nader Mahdi, Maple Ridge (CA); Chekib Nouira, Vancouver (CA); Hassen Guermazi, Vancouver (CA); Faouzi Kossentini, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 15/849,422

(22) Filed: Dec. 20, 2017

(65) Prior Publication Data

US 2019/0045182 A1    Feb. 7, 2019

(51) Int. Cl.
*H04N 19/00* (2014.01)
*H04N 19/105* (2014.01)
*H04N 19/14* (2014.01)
*H04N 19/503* (2014.01)
*H04N 19/86* (2014.01)
*H04N 19/176* (2014.01)
*H04N 19/107* (2014.01)
*H04N 19/436* (2014.01)
*H04N 19/119* (2014.01)
*H04N 19/147* (2014.01)

(52) U.S. Cl.
CPC ......... *H04N 19/105* (2014.11); *H04N 19/107* (2014.11); *H04N 19/119* (2014.11); *H04N 19/14* (2014.11); *H04N 19/147* (2014.11); *H04N 19/176* (2014.11); *H04N 19/436* (2014.11); *H04N 19/503* (2014.11); *H04N 19/86* (2014.11)

(58) Field of Classification Search
CPC .. H04N 19/593; H04N 19/126; H04N 19/176; H04N 19/182; H04N 19/61; H04N 19/625; H04N 19/159; H04N 19/107; H04N 19/14; H04N 19/11
See application file for complete search history.

(56) References Cited

U.S. PATENT DOCUMENTS

2003/0053711 A1    3/2003 Kim
2008/0025397 A1    1/2008 Zhao et al.
(Continued)

OTHER PUBLICATIONS

Extended European Search Report for European Patent Application No. 18207422.9, dated Aug. 30, 2019.
(Continued)

*Primary Examiner* — Frank F Huang
(74) *Attorney, Agent, or Firm* — Green, Howard & Mughal LLP.

(57) ABSTRACT

Techniques related to video encoding that provide for a decoupled prediction and coding structure for improved performance are discussed. Such techniques include determining final partitioning decisions for blocks of a picture by evaluating intra modes for candidate partitions by comparing the candidate partitions to intra predicted partitions generated using only original pixel samples and evaluating inter modes for the candidate partitions by comparing the candidate partitions to search partitions including original pixel samples and encoding using the final partitioning decision.

24 Claims, 9 Drawing Sheets

(56) References Cited

U.S. PATENT DOCUMENTS

2009/0110070 A1* 4/2009 Takahashi ............ H04N 19/176
                                                    375/240.12
2018/0020233 A1* 1/2018 Shimazaki ........... H04N 19/159

OTHER PUBLICATIONS

Search Report for European Patent Application No. 18207422.9, dated May 9, 2019.
Chun, et al., "Intra prediction mode selection for flicker reduction in H.264/AVC", IEEE Transactions on Consumer Electronics, New York, NY, vol. 52, No. 4, Nov. 1, 2006, pp. 1303-1310.
Fonseca, et al., "Open-Loop Prediction in H.264/AVC for High Definition Sequences", Simposio Brasileiro de Telecomunicacoes, Brazil, Sep. 3, 2007, pp. 1-4.

* cited by examiner

DECOUPLED PREDICTION AND CODING STRUCTURE FOR VIDEO ENCODING

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable. Furthermore, encoding speed and efficiency are important aspects of video encoding.

It may be advantageous to improve video encoding speed and compression rate while maintaining or even improving video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
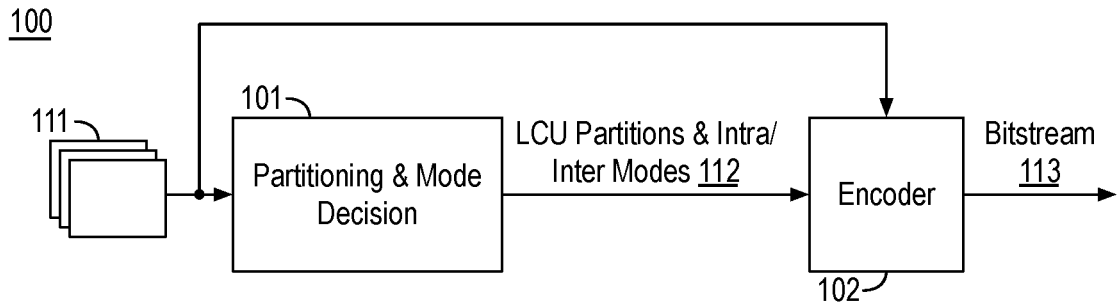
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to decoupling prediction and video coding.

Techniques discussed herein provide for decoupling the generation of the final partitioning decision and associated initial coding mode decisions based on using only source samples from a full standards compliant encoding with compliant local decode loop. For example, a mode decision module generates final partitioning decision and associated initial coding mode decisions without use of any of the data generated by a standards compliant encoder with a compliant decode loop. Subsequent to the generation of such final partitioning and initial coding mode decisions, an encoder such as a standards compliant encoder with compliant local decode loop employs such decisions to generate a standards compliant bitstream. That is, the final partitioning and initial coding mode decisions are generated independently and then transferred to a standards compliant encoder, where prediction-error information (i.e., residual data and corresponding transform coefficients) are generated in a compliant manner. For example, by using only input source pictures (e.g., source samples) to generate final prediction data including partitioning/mode decisions and related data such as motion vectors, a decoupling of mode decisions from standards compliant encoding may allow each of the two processes to run on independent hardware device, which improves parallelism in the encoding process, which, in turn, increases encode speed and reduces latency and memory requirements of the encoder. As used herein, the term sample or pixel sample may be any suitable pixel value. The term original pixel sample is used to indicate samples or values from input video and to contrast with reconstructed pixel samples, which are not original pixel samples but are instead reconstructed after encode and decode operations in a standards compliant encoder.

As discussed further herein, in various embodiments, an independent motion estimation and mode decision module may employ various approximation tools and techniques to generate prediction data and partitioning/mode decisions that provide substantial gains in speed. The use of only source input pictures in such mode decision processing and the use of various approximations may generate video quality artifacts relative to use of a fully compliant encoder for such prediction and partitioning/mode decisions. Techniques are discussed herein that employ only source samples and introduce various approximations while minimizing or eliminating such artifacts.

By decoupling partitioning/mode decisions from standards compliant encoding that uses the partitioning/mode decisions, two key aspects arise. First, the features used for partitioning/mode decisions need not use standards compliant techniques (though the actual encode will be standards compliant). Second, the flow of information is unidirectional such that information only flows from the partitioning/mode decisions module or process to the encode module or process. Reconstructed pixel samples using standards compliant coding, for example, are not used for the partitioning/mode decisions transferred to the standards compliant encoder.

FIG. 1 is an illustrative diagram of an example system 100 for providing video coding, arranged in accordance with at least some implementations of the present disclosure. As shown in FIG. 1, system 100 includes a partitioning and mode decision module 101 and an encoder 102. As shown, partitioning and mode decision module 101, which may be characterized as a partitioning, motion estimation, and mode decision module or the like, receives input video 111 and generates largest coding unit (LCU) partitions and corresponding coding modes (intra/inter modes) data 112, which may be characterized as final partitioning/mode decisions data, final partitioning/initial mode decision data, or the like. For example, for each LCU of each picture of input video 111, partitioning and mode decision module 101 may provide a final partition decision (i.e., data indicative of how the LCU is to be partitioned into coding units (CU)), a coding mode for each CU (i.e., an inter mode, an intra mode, or the like), and information, if needed, for the coding mode (i.e., a motion vector for inter coding).

As shown, encoder 102 receives LCU partitions and intra/inter modes data 112 and generates a bitstream 113 such as a standards compliant bitstream. For example, encoder 102 implements LCU partitions and intra/inter modes data 112 such that encoder 102 does not make any such decisions, encoder 102 does not make any partitioning decisions, or the like. Instead encoder implements final decisions made by partitioning and mode decision module 101, optionally adjusts any initial mode decisions made by partitioning and mode decision module 101, and implements such partitioning and mode decisions to generate a standards compliant bitstream 113.

As shown, system 100 receives input video 111 for coding and system provides video compression to generate bitstream 113 such that system 100 may be a video encoder implemented via a computer or computing device or the like. Bitstream 113 may be any suitable bitstream such as a standards compliant bitstream. For example, bitstream 113 may be H.264/MPEG-4 Advanced Video Coding (AVC) standards compliant, H.265 High Efficiency Video Coding (HEVC) standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to pictures and blocks and/or coding units for the sake of clarity of presentation. However, such pictures may be characterized as frames, video frames, sequences of frames, video sequences, or the like, and such blocks and/or coding units may be characterized as coding blocks, macroblocks, sub-units, sub-blocks, regions, sub-regions, etc. Typically, the terms block and coding unit are used interchangeably herein. For example, a picture or frame of color video data may include a luma plane or component (i.e., luma pixel values) and two chroma planes or components (i.e., chroma pixel values) at the same or different resolutions with respect to the luma plane. Input video 111 may include pictures or frames that may be divided into blocks and/or coding units of any size, which contain data corresponding to, for example, M×N blocks and/or coding units of pixels. Such blocks and/or coding units may include data from one or more planes or color channels of pixel data. As used herein, the term block may include macroblocks, coding units, or the like of any suitable sizes. As will be appreciated such blocks may also be divided into sub-blocks for prediction, transform, etc.

Figure 2:
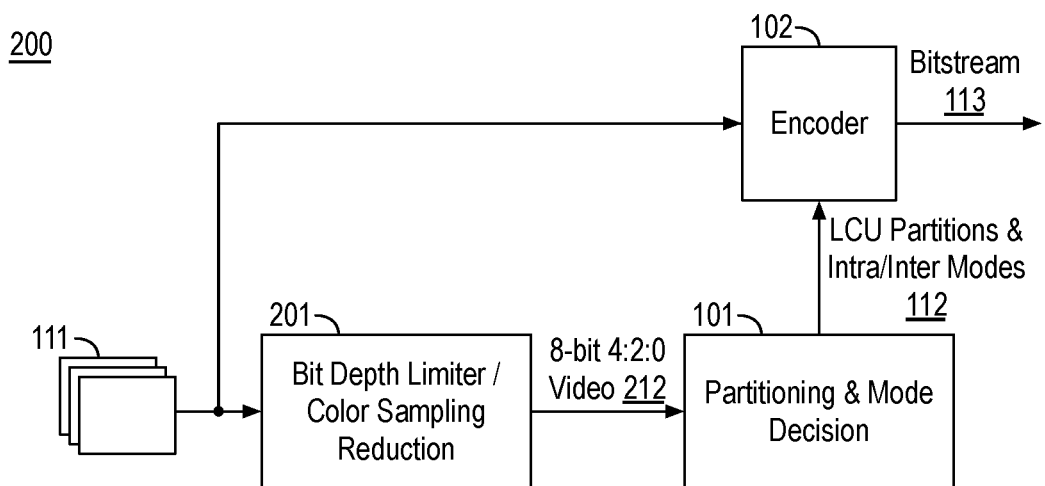
FIG. 2 is an illustrative diagram of another example system for providing video coding.

FIG. 2 is an illustrative diagram of another example system 200 for providing video coding, arranged in accordance with at least some implementations of the present disclosure. As shown in FIG. 2, system 200 includes the components of system 100 with the addition of a bit depth limiter/color sampler reduction module 201. For example, bit depth limiter/color sampler reduction module 201 may receive input video 111 and perform one or both of bit depth limiting to lower the bit depth of input video 111 (i.e., by keeping the most significant bits and discarding the least significant bits) and color sample reduction to reduce the color sampling of input video 111 to provide reduced bit depth and/or reduced color sampling video 212, which in the illustrated embodiment is provided as 8-bit 4:2:0 video. For example, partitioning and mode decision module 101 may operate on reduced bit depth and/or reduced color sampling video for the generation of LCU partitions and intra/inter modes data 112 while encoder 102 performs operations on full bit depth and/or full color sampling input video 111. In an embodiment, input video 111 is 10-bit 4:2:2 video and, as shown, reduced bit depth and/or reduced color sampling video 212 is 8-bit 4:2:0 video. However, input video 111 and reduced bit depth and/or reduced color sampling video 212 may be any video data such that input video 111 is at a higher bit depth and/or a higher color sampling than reduced bit depth and/or reduced color sampling video 212. Such reduction in bit depth and/or color sampling may reduce computational resources and/or memory transfers requirements for partitioning and mode decision module 101.

For example, input video 111 may be received with a bit depth that is at least 8 bits (i.e. the luma and chroma values associated with a given source pixel/sample are represented using at least 8 bits each, e.g., 10 bits per value). Relative to 8-bit data, data with more than 8 bits per pixel/sample requires more memory transfers (to move the data between memory and processor) and more complex arithmetic operations. To reduce the impact of high bit depth on the required memory and computational resources, input video 111 may be converted to 8-bit data by keeping the eight most significant bits. For example, for 10-bit input video data, the two least significant bits are discarded. Furthermore, input video 111 with higher color representation (e.g., 4:2:2 or 4:4:4) includes increased chroma information. However, processing chroma information in 4:2:0 video data, where the number of chroma samples is half of the number of luma samples may provide a balance between the video quality value in the use of chroma information and the computational and memory transfer cost thereof.

Figure 3:
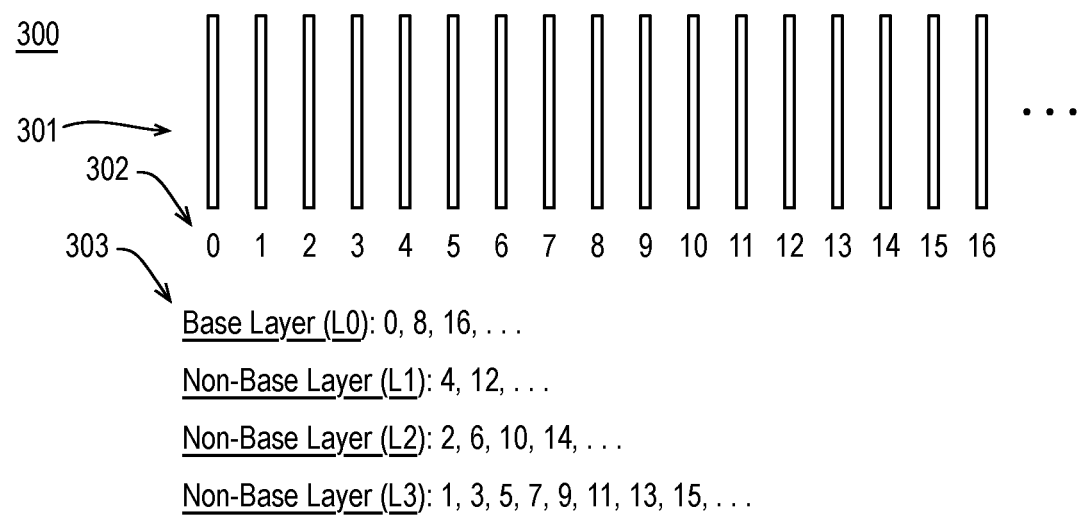
FIG. 3 illustrates an example group of pictures.

FIG. 3 illustrates an example group of pictures 300, arranged in accordance with at least some implementations of the present disclosure. As shown in FIG. 3, group of pictures 300 may include any number of pictures 301 such as 64 pictures (with 0-16 being illustrated) or the like. Furthermore, pictures 301 may be provided in a temporal order 302 such that pictures 301 are presented in temporal order while pictures 301 are coded in a coding order (not shown) such that coding order is different with respect to temporal order 302. Furthermore, pictures 301 may be provided in a picture hierarchy 303 such that a base layer (L0) of pictures 301 includes pictures 0, 8, 16, and so on; a non-base layer (L1) of pictures 301 includes pictures 4, 12, and so on; a non-base layer (L2) of pictures 301 includes pictures 2, 6, 10, 14, and so on; and a non-base layer (L3) of pictures 301 includes pictures 1, 3, 5, 7, 9, 11, 13, 15, and so on. For example, moving through the hierarchy, for inter modes, pictures of L0 may only reference other pictures of L0, pictures of L1 may only reference pictures of L0, pictures of L2 may only reference pictures of L0 or L1, and pictures of L3 may reference pictures of any of L0-L2. For example, pictures 301 include base layer pictures and non-base layer pictures such that base layer pictures are reference pictures for non-base layer pictures but non-base layer pictures are not reference pictures for base layer pictures as shown. In an embodiment, input video 111 includes group of pictures 300 and/or systems 100, 200 implement group of pictures 300 with respect to input video 111. Although illustrated with respect to example group of pictures 300, input video 111 may have any suitable structure implementing group of pictures 300, another group of pictures format, etc.

In an embodiment, a prediction structure for coding video includes groups of pictures such as group of pictures 300. For example, in the context of broadcast and streaming implementations, the prediction structure may be periodic and may include periodic groups of pictures (GOPs). In an embodiment, a GOP includes about 1-second of pictures organized in the structure described in FIG. 3, followed by another GOP that starts with an I picture, and so on.

Figure 4:
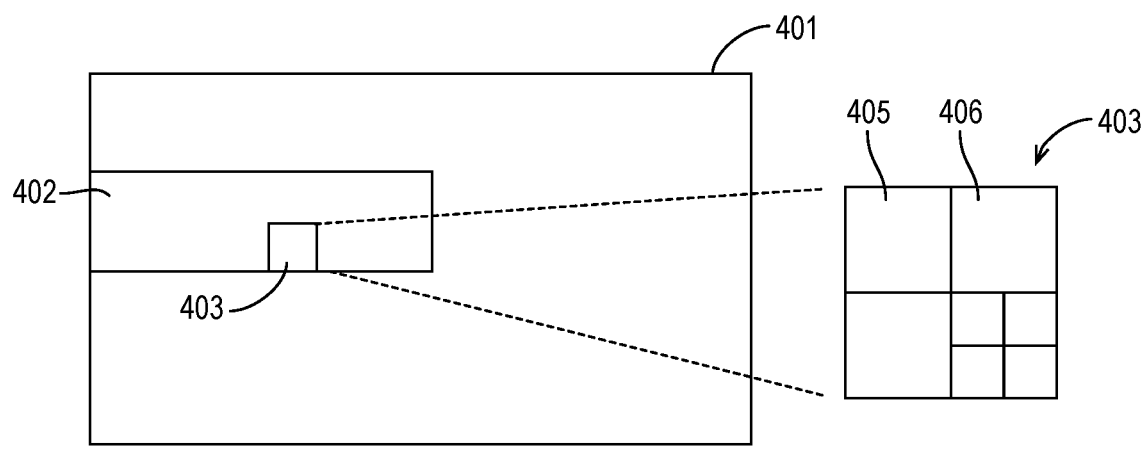
FIG. 4 illustrates an example video picture.

FIG. 4 illustrates an example video picture 401, arranged in accordance with at least some implementations of the present disclosure. Video picture 401 may include any picture of a video sequence or clip such as a VGA, HD, Full-HD, 4K, 8K, etc. video picture. For example, video picture 401 may be any of pictures 301 of group of pictures 300. As shown, video picture 401 may be segmented or partitioned into one or more slices as illustrated with respect to slice 402 of video picture 401. Furthermore, video picture 401 may be segmented or partitioned into one or more LCUs as illustrated with respect to LCU 403, which may, in turn, be segmented into one or more coding units as illustrated with respect to CUs 405, 406 and/or prediction units (PUs) and transform units (TUs), not shown.

Figure 5:
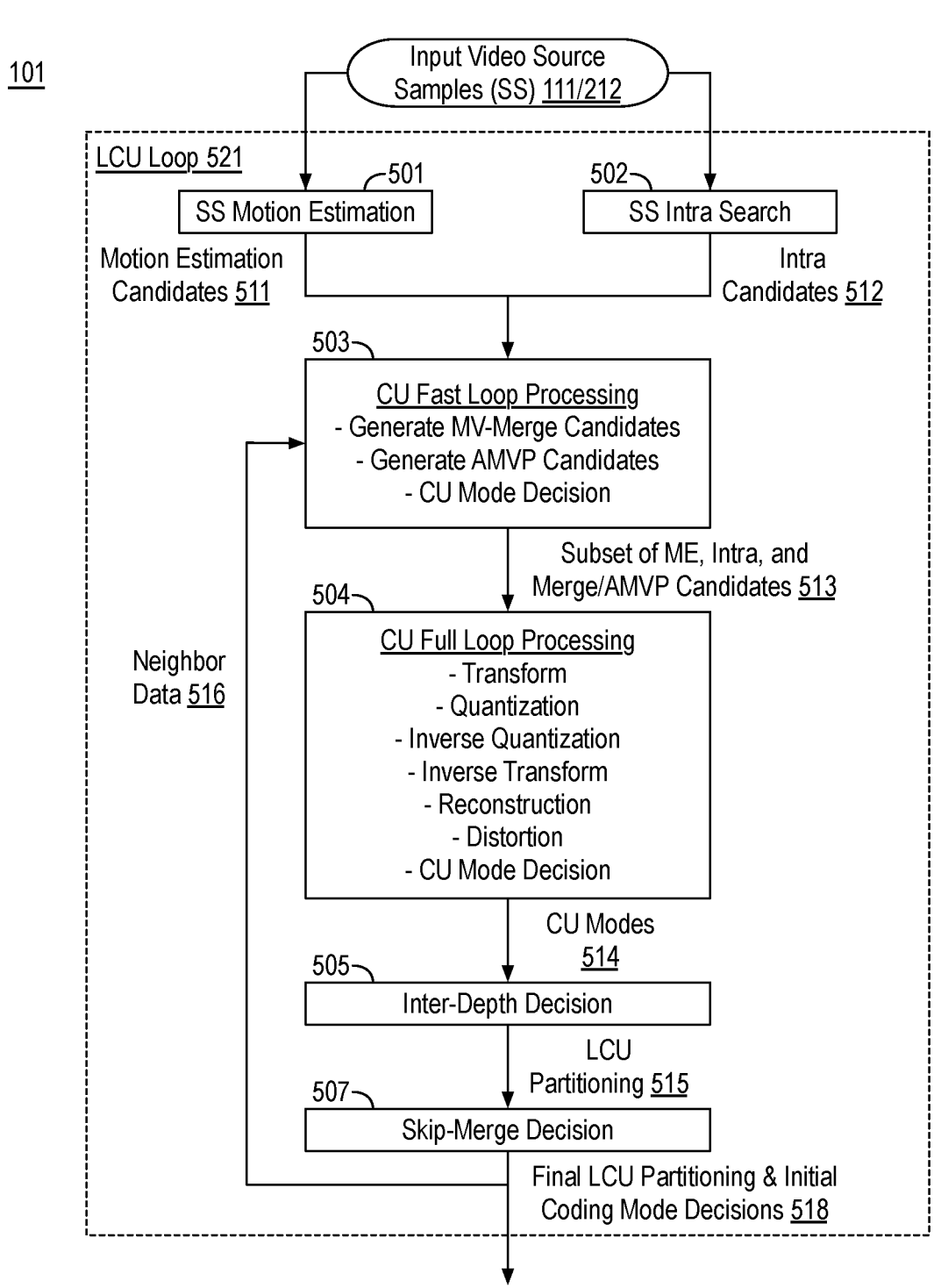
FIG. 5 is an illustrative diagram of an example partitioning and mode decision module for providing LCU partitions and intra/inter modes data.

FIG. 5 is an illustrative diagram of an example partitioning and mode decision module 101 for providing LCU partitions and intra/inter modes data 112, arranged in accordance with at least some implementations of the present disclosure. As shown in FIG. 5, partitioning and mode decision module 101 may include or implement an LCU loop 521 that includes a source samples (SS) motion estimation module 501, an SS intra search module 502, a CU fast loop processing module 503, a CU full loop processing module 504, an inter-depth decision module 505, and a skip-merge decision module 507. As shown, LCU loop 521 receives input video 111 or reduced bit depth and/or reduced color sampling video 212 and LCU loop 521 generates final LCU partitioning and initial mode decisions data 518. Final LCU partitioning and initial mode decisions data 518 may be any suitable data that indicates or describes partitioning for the LCU into CUs and a coding mode decision for each CU of the LCU. In an embodiment, final LCU partitioning and initial mode decisions data 518 includes final partitioning data that will be implemented without modification by encoder 102 and initial mode decisions that may be modified as discussed herein by encoder final LCU partitioning and mode decisions data 518. In an embodiment, although described herein as initial mode decisions, such mode decisions may be final and are implemented without modification by encoder 102. For example, the mode decisions may be initial or final. For example, the coding mode decisions may include an intra mode (i.e., one of the available intra modes based on the standard being implemented) or an inter mode (i.e., skip, merge, or motion estimation, ME). Furthermore, LCU partitioning and mode decisions data 518 may include any additional data needed for the particular mode (e.g., a motion vector for an inter mode). For example, in the context of HEVC, a coding tree unit may be 64×64 pixels, which may define an LCU. An LCU may be partitioned for coding into CUs via quad-tree partitioning such that the CUs may be 32×32, 16×16 pixels, or 8×8 pixels. Such partitioning may be indicated by LCU partitioning and mode decisions data 518. Furthermore, such partitioning is used to evaluate candidate partitions (candidate CUs) of an LCU.

As shown, SS motion estimation module 501 receives input video 111 or reduced bit depth and/or reduced color sampling video 212. In the following discussion, input video 111 or reduced bit depth and/or reduced color sampling video 212 are characterized as input video 111, 212 for the sake of clarity of presentation. SS motion estimation module 501 performs a motion search for CUs or candidate partitions of a current picture of input video 111, 212 using one or more reference pictures of input video 111, 212. That is, SS motion estimation module 501 performs a motion search for a CU of a current picture by searching for matching CU(s) or partitions of one or more reference pictures of input video 111, 212 such that the reference pictures include only original pixel samples of input video 111, 212. For example, SS motion estimation module 501 performs the motion search without reconstructing pixels into reconstructed reference pictures using a local decode loop. For example, SS motion estimation module 501 evaluates multiple inter modes (of differing motion vectors, reference pictures, etc.) for candidate partitions of a block or CU by comparing the candidate partitions to search partitions including only original pixel samples from a reference picture input video 111. Such search partitions are those partitions that are searched during motion estimation, for example, for a particular candidate partition. As shown, SS motion estimation module 501 generates motion estimation candidates 511 (i.e., MVs) corresponding to CUs of a particular partitioning of a current LCU under evaluation. For example, for each CU, one or more MVs may be provided. In an embodiment, SS motion estimation module 501 uses a non-standards compliant interpolation filter to generate an interpolated search region for sub-pel MV search.

Furthermore, SS intra search module 502 receives input video 111, 212 and SS intra search module 502 intra modes for CUs of a current picture of input video 111, 212 using the current picture of input video 111, 212. That is, SS intra search module 502 performs an intra mode evaluation for a CU or candidate partition of a current picture by comparing the CU to an intra prediction block generated (based on the current intra mode being evaluated) using original pixel samples of the current picture input video 111, 212. For example, SS intra search module 502 performs the intra mode evaluation without reconstructing pixels into reconstructed pixel samples (e.g., of previously coded CUs) using a local decode loop. As shown, SS intra search module 502 generates intra candidates 512 (i.e., selected intra modes) corresponding to CUs of a particular partitioning of a current LCU under evaluation. For example, for each CU, one or more intra candidates may be provided. In an embodiment, a best partitioning decision and corresponding best intra and/or inter candidates (e.g., having a lowest distortion or lowest rate distortion cost or the like) from motion estimation candidates 511 and intra candidates 512 are provided for use by encoder 102 as discussed herein. For example, subsequent processing may be skipped. Rate distortion cost may include any suitable rate distortion cost such as a sum of a distortion and a product of a Lagrangian multiplier and a rate. For example, the distortion may be a measurement of squared error distortion, an HVS-weighted squared error distortion, etc.

CU fast loop processing module 503 receives motion estimation candidates 511, intra candidates 512, and neighbor data 516 and, as shown, generates MV-merge candidates, generates advanced motion vector prediction (AMVP) candidates, and makes a CU mode decision. Neighbor data 516 includes any suitable data for spatially neighboring CUs of the current CUs being evaluated such as intra and/or inter modes of the spatial neighbors. CU fast loop processing module 503 generates MV-merge candidates using any suitable technique or techniques. For example, merge mode may provide motion inference candidates using MVs from spatially neighboring CUs of a current CU. For example, one or more MVs from spatially neighboring CUs may be provided (e.g., inherited) as MV candidates for the current CU. Furthermore, CU fast loop processing module 503 generates AMVP candidates using any suitable technique or techniques. In an embodiment, CU fast loop processing module 503 may use data from a reference picture and data from neighboring CUs to generate AMVP candidate MVs. Furthermore, in generating MV-merge and/or AMVP candidates, non-standards compliant techniques may be used. Predictions for the MV-merge and AMVP candidates are generated using only source samples.

As shown, CU fast loop processing module 503 makes a coding mode decision for each CU for the current partitioning based on motion estimation candidates 511, intra candidates 512, MV-merge candidates, and AMVP candidates. The coding mode decision may be made using any suitable technique or techniques. In an embodiment, a sum of a distortion measurement and a weighted rate estimate is used to evaluate the intra and inter modes for the CUs. For example, a distortion between the current CU and prediction CUs (generated using the corresponding mode) may be determined and combined with an estimated coding rate to determine the best candidates. As shown, a subset of the ME, intra, and merge/AMVP candidates 513 may be generated as a subset of all available candidates.

Subset of the ME, intra, and merge/AMVP candidates 513 is provided to CU full loop processing module 504. As shown, CU full loop processing module 504 performs, for a residual block for each coding mode of subset of the ME, intra, and merge/AMVP candidates 513 (i.e., the residual being a difference between the CU and the prediction CU generated using the current mode), forward transform, forward quantization, inverse quantization, and inverse transform to form a reconstructed residual. Then, CU full loop processing module 504 generates a reconstruction of the CU (i.e., by adding the reconstructed residual to the prediction CU) and measures distortion for each mode of subset of the ME, intra, and merge/AMVP candidates 513. The mode with optimal rate distortion is selected as CU modes 514.

CU modes 514 are provided to inter-depth decision module 505, which may evaluate the available partitions of the current LCU to generate LCU partitioning data 515. As shown, LCU partitioning data 515 is provided to skip-merge decision module 507, which, for any CUs that have a coding mode corresponding to a merge MV, determines whether the CU is a skip CU or a merge CU. For example, for a merge CU, the MV is inherited from a spatially neighboring CU and a residual is sent for the CU. For a skip CU, the MV is inherited from a spatially neighboring CU (as in merge mode) but no residual is sent for the CU.

As shown, after such merge-skip decisions, LCU loop 521 provides final LCU partitioning and initial mode decisions data 518 that, as discussed, indicates or describes partitioning for the LCU into CUs and a coding mode decision for each CU (as well as any information needed for that mode decision).

Figure 6:
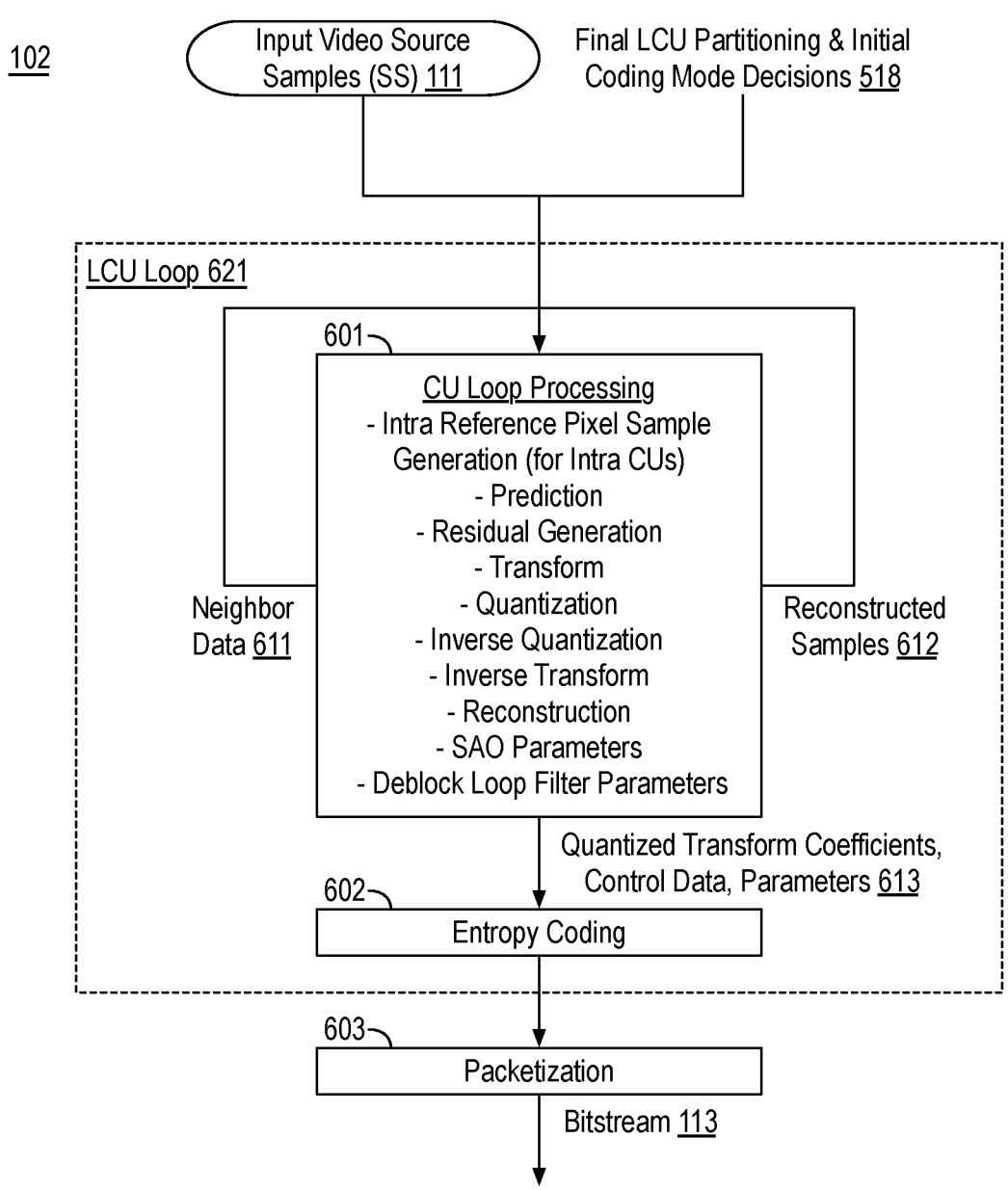
FIG. 6 is an illustrative diagram of an example encoder for generating a bitstream.

FIG. 6 is an illustrative diagram of an example encoder 102 for generating bitstream 113, arranged in accordance with at least some implementations of the present disclosure. As shown in FIG. 6, encoder 102 may include or implement an LCU loop 621 (e.g., an LCU loop for an encode pass) that includes a CU loop processing module 601 and an entropy coding module 602. Also as shown, encoder 102 may include a packetization module 603. As shown, LCU loop 621 receives input video 111 and final LCU partitioning and initial mode decisions data 518 and LCU loop 621 generates quantized transform coefficients, control data, and parameters 613, which may be entropy encoded by entropy coding module 602 and packetized by packetization module 603 to generate bitstream 113.

For example, CU loop processing module 601 receives input video 111 and final LCU partitioning and initial mode decisions data 518. Based on final LCU partitioning and initial mode decisions data 518, CU loop processing module 601, as shown, generates intra reference pixel samples for intra CUs (as needed). For example, intra reference pixel samples may be generated using neighboring reconstructed pixel samples (generated via a local decode loop). As shown, for each CU, CU loop processing module 601 generates a prediction CU using neighbor data 611 (e.g., data from neighbors of the current CU), as needed. For example, the prediction CU may be generated for inter modes by retrieving previously reconstructed pixel samples for a CU indicated by a MV or MVs from a reconstructed reference picture or pictures and, if needed, combining the retrieved reconstructed pixel samples to generate the prediction CU. For intra modes, the prediction CU may be generated using the neighboring reconstructed pixel samples from the picture of the CU based on the intra mode of the current CU. As shown, a residual is generated for the current CU. For example, the residual may be generated by differencing the current CU and the prediction CU.

The residual is then forward transformed and forward quantized to generate quantized transform coefficients, which are included in quantized transform coefficients, control data, and parameters 613. Furthermore, in a local decode loop, for example, the transform coefficients are inverse quantized and inverse transformed to generate a reconstructed residual for the current CU. As shown, CU loop processing module 601 performs a reconstruction for the current CU by, for example, adding the reconstructed residual and the prediction CU (as discussed above) to generate a reconstructed CU. The reconstructed CU may be combined with other CUs to reconstruct the current picture or portions thereof using additional techniques such as sample adaptive offset (SAO) filtering, which may include generating SAO parameters (which are included in quantized transform coefficients, control data, and parameters 613) and implementing the SAO filter on reconstructed CUs and/or deblock loop filtering (DLF), which may include generating DLF parameters (which are included in quantized transform coefficients, control data, and parameters 613) and implementing the DLF filter on reconstructed CUs. Such reconstructed CUs may be provided as reference pictures (e.g., stored in a reconstructed picture buffer) for example. Such reference pictures or portions thereof are provided as reconstructed samples 612, which are used for the generation of prediction CUs (in inter and intra modes) as discussed above.

As shown, quantized transform coefficients, control data, and parameters 613, which include transform coefficients for residual coding units, control data such as final LCU partitioning and mode decisions data (i.e., from final LCU partitioning and initial mode decisions data 518), and parameters such as SAO/DLF filter parameters, may be entropy encoded and packetized to form bitstream 113. Bitstream 113 may be any suitable bitstream such as a standards compliant bitstream. For example, bitstream 113 may be H.264/MPEG-4 Advanced Video Coding (AVC) standards compliant, H.265 High Efficiency Video Coding (HEVC) standards compliant, VP9 standards compliant, etc.

As discussed, partitioning and mode decision module 101 generates partitioning and mode decision data for LCUs of input video 111 using original pixel samples and encoder 102 implements the partitioning and mode decision data on input video 111 (including use of a local decode loop) to generate bitstream 113. Use of only original pixel samples for the generation of partitioning and mode decision data may offer decoupling between partitioning and mode decision module 101 (which may be implemented as hardware such as dedicated integrated circuit) and encoder 102 (which may be implemented as separate hardware such as a separate dedicated integrated circuit). Such decoupling provides efficiencies such as decoupling of hardware, parallelization, processing speed, etc. However, use of only original pixel samples for the generation of partitioning and mode decision data may degrade visual quality. Discussion now turns to techniques for improving visual quality in decoupled systems.

Figure 7:
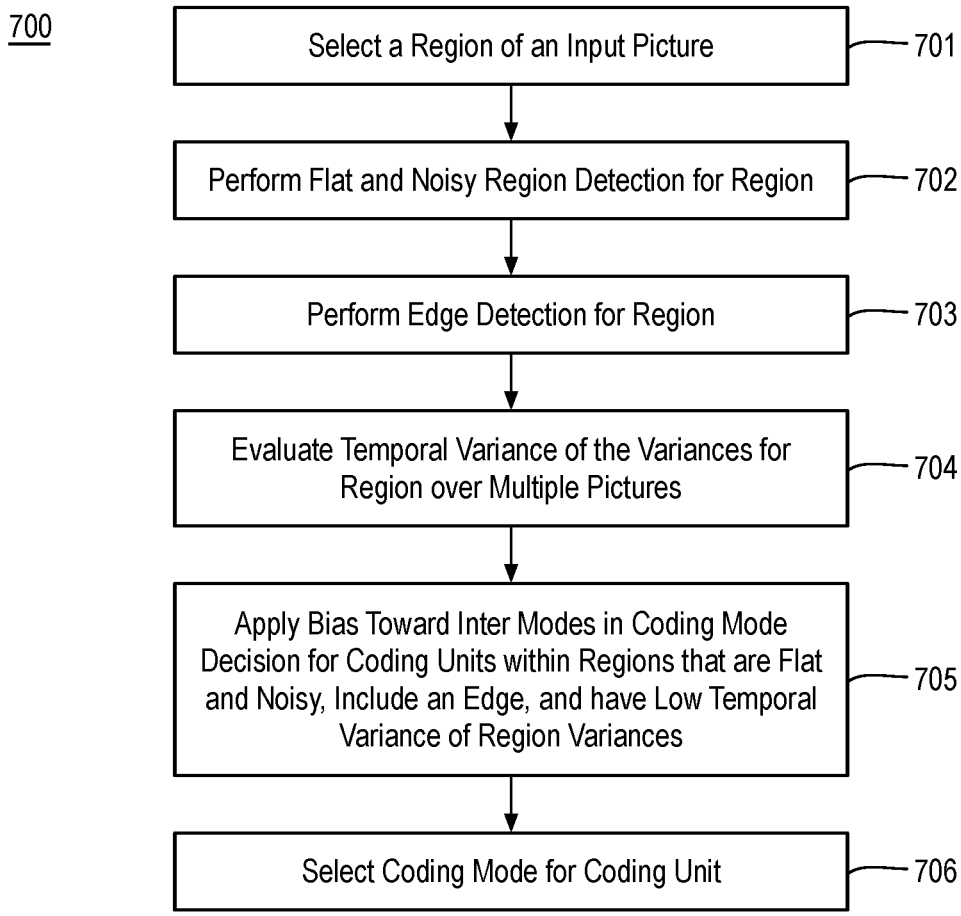
FIG. 7 is a flow diagram illustrating an example process for reducing flickering artifacts.

FIG. 7 is a flow diagram illustrating an example process 700 for reducing flickering artifacts, arranged in accordance with at least some implementations of the present disclosure. Process 700 may include one or more operations 701-706 as illustrated in FIG. 7. Process 700 may be performed by a system (e.g., system 100 as discussed herein) to reduce flickering artifacts in video coding. In an embodiment, process 700 is implemented by CU fast loop processing module 503 and CU full loop processing module 504 of partitioning and mode decision module 101.

For example, flickering in noisy flat areas may occur in areas that are spatially flat and that are noisy. Examples of such areas include very noisy sky areas in a picture. Flickering appear in such areas due to the non-homogeneous distribution of coding modes (e.g., intra, inter) across space (i.e., the area contains a mix of intra and inter coded blocks) and time (the coding mode changes with time). For example, the appearance of flickering may be due to the switching from one frame to the next between intra modes and inter modes. Blocks coded using intra modes may be smooth and not contain much noise while blocks coded using inter modes may be sharper due to better noise reproduction. Changes in the coding modes between adjacent blocks may lead to the appearance of discontinuity in sharpness and consequently flickering in the picture. Process 700 may address such flickering artifacts.

Processing begins at operation 701, where a region is selected for evaluation. The region may be any suitable region of an input picture such as the entirety of the picture, a slice of the picture, a quadrant of the picture, a predefined grid portion of the picture, or an LCU of the picture. Processing continues at operation 702, where a determination may be made as to whether the selected region is a flat and noisy region by performing a flat and noisy region detection. The flat and noisy region detection may be performed using any suitable technique or techniques such as those discussed with respect to FIG. 8.

Figure 8:
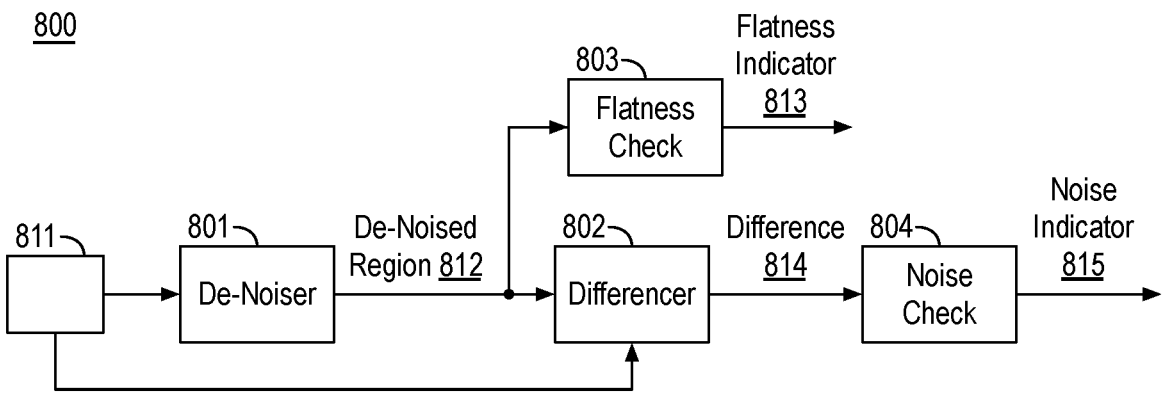
FIG. 8 is an illustrative diagram of an example flat and noisy region detector.

FIG. 8 is an illustrative diagram of an example flat and noisy region detector 800, arranged in accordance with at least some implementations of the present disclosure. As shown in FIG. 8, flat and noisy region detector 800 may include a de-noiser 801, a differencer 802, a flatness check module 803, and a noise check module 804. As shown, de-noiser 801 receives an input region 811 and de-noises input region 811 using any suitable technique or techniques such as filtering techniques to generate a de-noised region 812. De-noised region 812 is provided to flatness check module 803, which checks de-noised region 812 for flatness using any suitable technique or techniques. In an embodiment, flatness check module 803 determines a variance of de-noised region 812 and compares the variance to a predetermined threshold. If the variance does not exceed the threshold, a flatness indicator 813 is provided indicating de-noised region 812 is flat. Furthermore, input region 811 and de-noised region 812 are provided to differencer 802, which may difference input region 811 and de-noised region 812 using any suitable technique or techniques to generate difference 814. As shown, difference 814 is provided to noise check module 804, which checks difference 814 to determine whether input region 811 is a noisy region using any suitable technique or techniques. In an embodiment, noise check module 804 determines a variance of difference 814 and compares the variance to a predetermined threshold. If the variance meets or exceeds the threshold, a noise indicator 815 is provided indicating input region 811 is noisy. If both flatness indicator 813 and noise indicator 815 are affirmed for input region 811, input region 811 is determined to be a flat and noisy region.

Returning to FIG. 7, processing continues at operation 703, where edge detection is performed on the region to determine whether any edges exist within the region or block. Edge detection may be performed using any suitable technique or techniques. Processing continues at operation 704, where a variance of variances of the region over time is evaluated. For example, for the current picture, a variance of the region is determined. Furthermore, multiple pictures with respect to the current picture are selected. Such pictures may be temporally adjacent to the current picture (before or after or both) or adjacent in an encode order. For the collocated region of such pictures, a variance for each such region is also determined. A variance of the multiple variances (i.e., including the variance of the region of the current picture and the variances of the collocated regions of the multiple pictures) is determined. The variance of the variances is then compared to a threshold. If the variance does not exceed the threshold, the region is deemed to be homogenous over time. If the variance of the variances exceeds the threshold, the region is discarded from processing discussed with respect to operation 705 below.

Processing continues at operation 705, where, during coding mode decisions for coding units that are within regions that are flat and noisy (as detected at operation 702), include one or more edges (as detected at operation 703), and are homogeneous over time as indicated by a variance of spatial variances over multiple pictures being less than a threshold (as detected at operation 704), a bias may be applied toward inter coding modes (as opposed to intra coding modes) for the coding units. For example, if the region is not flat and noisy, no edges are detected, or the region is not homogeneous over time, no bias is applied to the coding units within the region. The bias may be applied using any suitable technique or techniques. In an embodiment, a predetermined weighting factor is added to the cost for intra modes or multiplied by such cost while not being applied to the cost for inter modes. In an embodiment, a predetermined additive term may, in addition or in the alternative be subtracted from the cost for inter modes or the cost of inter modes may be divided by a factor. For example, the inter and intra mode costs may be rate distortion costs. Processing continues at operation 706, where a coding mode is selected for a coding unit within a flat and noisy region. For example, the coding mode may be selected using any suitable technique or techniques while the bias discussed with respect to operation 703 is applied. For example, the coding mode may be selected using rate distortion optimization techniques while the bias toward use of inter modes is applied. Such inter modes may include any inter modes such as inter, merge, or AMVP modes.

As discussed with respect to process 700, a flat region detection and a noisy region detection may be performed for a region of an input picture to determine whether the region is a flat and noisy region and generating a coding mode decision for a block of the region may include applying a bias, in response to the region being a flat and noisy region, to one or both of an intra mode result and an inter mode result to favor selection of the inter mode result for coding the block.

Process 700 or portions thereof may be repeated any number of times either in series or in parallel for any number of regions of an input picture.

Figure 9:
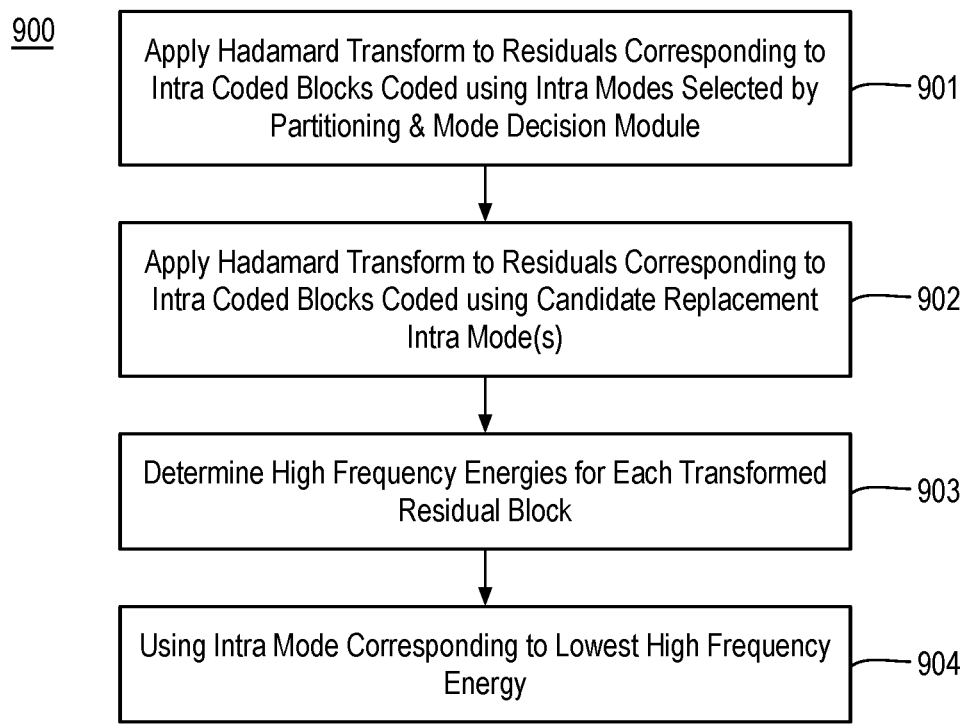
FIG. 9 is a flow diagram illustrating an example process for reducing line artifacts.

FIG. 9 is a flow diagram illustrating an example process 900 for reducing line artifacts, arranged in accordance with at least some implementations of the present disclosure. Process 900 may include one or more operations 901-904 as illustrated in FIG. 9. Process 900 may be performed by a system (e.g., system 100 as discussed herein) to reduce line artifacts in video coding. In an embodiment, process 900 is implemented by CU loop processing module 601 of encoder 102. Process 900 or portions thereof may be repeated any number of times either in series or in parallel for any number of intra coded blocks or coding units of an input picture.

For example, line artifacts may appear as short line segments in intra coded blocks such as in flat areas next to edges. Such line artifacts may be due to errors in the reference samples used in intra prediction in the encode pass such that reference samples from the reconstructed reference pictures may contain errors due to quantization. Pixels errors may be amplified to line errors in some intra coding modes (e.g., vertical or horizontal modes) through, for example, pixel duplication.

Processing begins at operation 901, where a transform such as a Hadamard transform is applied to residuals corresponding to intra coded blocks coded using intra modes selected by partitioning and mode decision module 101. For example, during the encode pass as implemented by encoder 102, a Hadamard transform or other suitable transform is applied to residuals generated based on implementing an intra coding mode selected by partitioning and mode decision module 101 (e.g., an intra coding mode selected using only original pixel samples). Processing continues at operation 902, where the transform is applied to residuals corresponding to intra coded blocks coded using an intra mode or modes other than that selected by partitioning and mode decision module 101. The other intra mode(s) may be any suitable mode(s) such as a DC mode, a planar mode, etc.

Processing continues at operation 903, where high frequency energies are determined for each of the transformed residual blocks generated at operations 901, 902. The high frequency energies may be determined using any suitable technique or techniques. For example, the high frequency energies may be determined as a measure (e.g., average, weighted average, etc.) of the high frequency components of the transformed residual blocks (e.g., the residuals not in the top left quadrant of the transformed residual blocks, the residuals in the bottom right quadrant of the transformed residual blocks, etc.). For example, the transforms performed at operations 901, 902 generate transform residual coefficients (e.g., blocks of transform residual coefficients having the same size as the residual blocks). A high frequency coefficient energy value is then generated as a high frequency characteristic of transform residual coefficients. The high frequency coefficient energy value may be any suitable value such as an average of the coefficients corresponding to high energy components, a median of such coefficients, etc. As discussed, the coefficients selected to high frequency coefficient energy value may be any such coefficients that exclude the DC coefficient of the transform residual coefficients (e.g., the top left value of the transform residual coefficients block). In an embodiment, coefficients in a bottom right corner of the transform residual coefficients block are used. For example, for a 16×16 transform residual coefficients block, the bottom-right 4×4 transform residual coefficients may be used such that those transform residual coefficients correspond to the highest frequency components. In an embodiment, all transform residual coefficients of the transform residual coefficients block are used except for the DC coefficient (e.g., which corresponds to a lowest frequency component). In an embodiment, determining the high frequency coefficient energy value comprises averaging multiple transform residual coefficients (from the block) excluding a DC transform coefficient of the transform residual coefficients.

Processing continues at operation 904, where an intra mode corresponding to the lowest high frequency energy of those determined at operation 903 may be used for coding the block. In an embodiment, prior to performing operation 902, a high frequency energy for the transformed residual block generated at operation 901 may be compared to a threshold and processing may only proceed at operation 902 if the high frequency energy exceeds the threshold. Otherwise, the intra mode selected by partitioning and mode decision module 101 is used for coding the block.

As discussed with respect to process 900, a transform may be applied, at a video encoder, to a residual block corresponding to an individual block and a prediction block generated using an intra mode selected by partitioning and mode decision module 101 (e.g., the residual block is the difference of the individual block and the prediction block) to generate corresponding transformed residuals. For example, the transform may be a Hadamard transform and the intra mode may be intra horizontal or intra vertical. Furthermore, the transform may be applied to another residual block or blocks corresponding to the individual block and prediction block(s) generated using other intra mode(s) to generate additional transformed residuals. High frequency energy values may be determined for each of the transformed residuals. In response to one of the other transformed residuals having a lower high frequency energy value than the energy value of the transformed residual using the intra mode selected by partitioning and mode decision module 101, the intra mode selected by partitioning and mode decision module 101 is discarded and the lowest high frequency energy value intra mode is used to encode the individual block.

Figure 10:
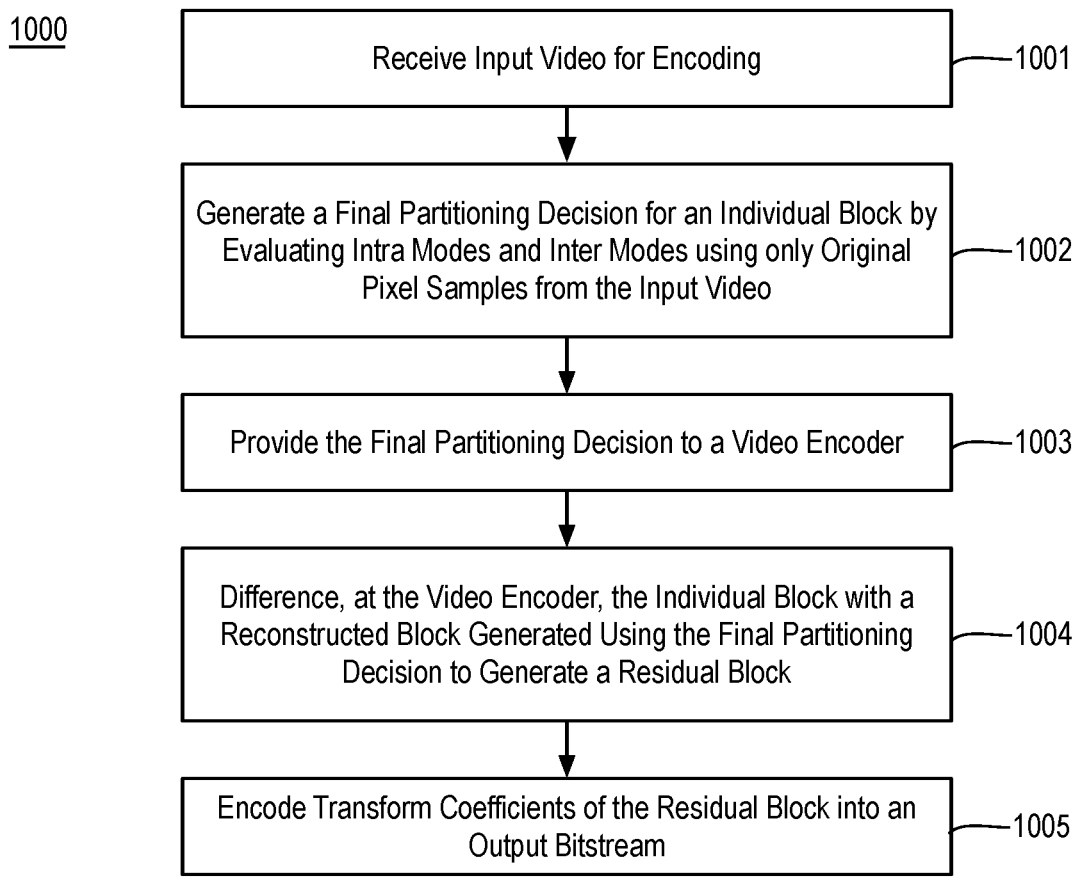
FIG. 10 is a flow diagram illustrating an example process for video encoding.

FIG. 10 is a flow diagram illustrating an example process 1000 for video encoding, arranged in accordance with at least some implementations of the present disclosure. Process 1000 may include one or more operations 1001-1005 as illustrated in FIG. 10. Process 1000 may form at least part of a video coding process. By way of non-limiting example, process 1000 may form at least part of a video coding process as performed by any device or system as discussed herein such as system 100. Furthermore, process 1000 will be described herein with reference to system 1100 of FIG. 11.

Figure 11:
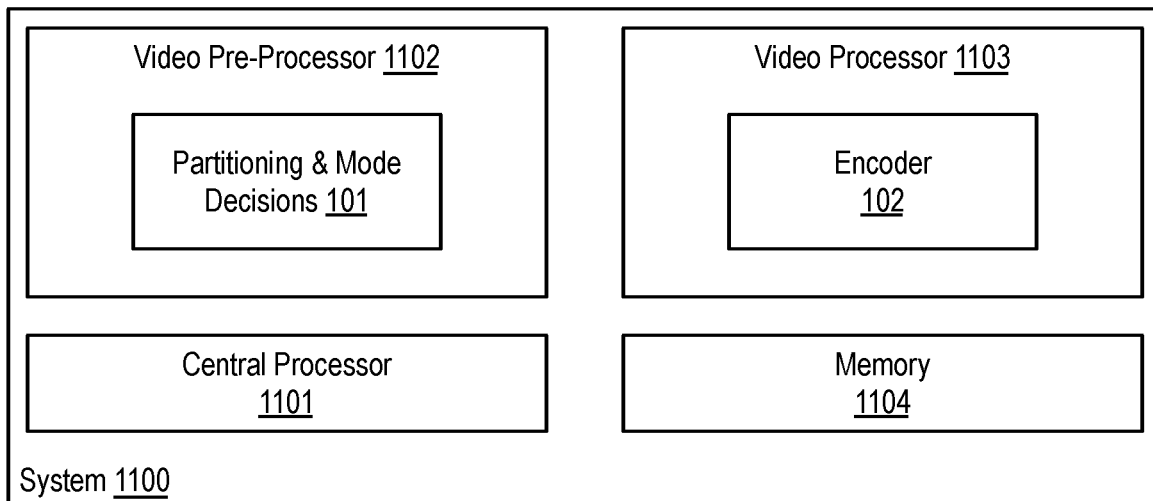
FIG. 11 is an illustrative diagram of an example system for video encoding.

FIG. 11 is an illustrative diagram of an example system 1100 for video encoding, arranged in accordance with at least some implementations of the present disclosure. As shown in FIG. 11, system 1100 may include a central processor 1101, a video pre-processor 1102, a video processor 1103, and a memory 1104. Also as shown, video pre-processor 1102 may include or implement partitioning and mode decisions module 101 and video pre-processor 1102 may include or implement encoder 102. In the example of system 1100, memory 1104 may store video data or related content such as input video data, picture data, partitioning data, modes data, and/or any other data as discussed herein.

As shown, in some embodiments, partitioning and mode decisions module 101 is implemented via video pre-processor 1102. In other embodiments, partitioning and mode decisions module 101 or portions thereof are implemented via central processor 1101 or another processing unit such as an image processor, a graphics processor, or the like. Also as shown, in some embodiments, encoder 102 is implemented via video processor 1103. In other embodiments, encoder 102 or portions thereof are implemented via central processor 1101 or another processing unit such as an image processor, a graphics processor, or the like.

Video pre-processor 1102 may include any number and type of video, image, or graphics processing units that may provide the operations as discussed herein. Such operations may be implemented via software or hardware or a combination thereof. For example, video pre-processor 1102 may include circuitry dedicated to manipulate pictures, picture data, or the like obtained from memory 1104. Similarly, video processor 1103 may include any number and type of video, image, or graphics processing units that may provide the operations as discussed herein. Such operations may be implemented via software or hardware or a combination thereof. For example, video processor 1103 may include circuitry dedicated to manipulate pictures, picture data, or the like obtained from memory 1104. Central processor 1101 may include any number and type of processing units or modules that may provide control and other high level functions for system 1100 and/or provide any operations as discussed herein. Memory 1104 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1104 may be implemented by cache memory.

In an embodiment, one or more or portions of partitioning and mode decisions module 101 or encoder 102 are implemented via an execution unit (EU). The EU may include, for example, programmable logic or circuitry such as a logic core or cores that may provide a wide array of programmable logic functions. In an embodiment, one or more or portions of partitioning and mode decisions module 101 or encoder 102 are implemented via dedicated hardware such as fixed function circuitry or the like. Fixed function circuitry may include dedicated logic or circuitry and may provide a set of fixed function entry points that may map to the dedicated logic for a fixed purpose or function. In an embodiment, partitioning and mode decisions module 101 is implemented via field programmable grid array (FPGA).

Returning to discussion of FIG. 10, process 1000 may begin at operation 1001, where input video is received for encoding such that the input video includes a plurality of pictures. The input video may be received using any suitable technique or techniques and the input video may be video data in any suitable format. In an embodiment, process 1000 further includes decreasing one of a bit depth or a chroma subsampling of the input video to generate second input video such that the coding mode decision generated at operation 1002 is made using the lower bit depth or a chroma subsampling video and the differencing discussed with respect to operation 1004 uses higher bit depth or a chroma subsampling video.

Processing continues at operation 1002, where a final partitioning decision is generated for an individual block of a first picture of the plurality of pictures by evaluating a plurality of intra modes for candidate partitions of the individual block and evaluating a plurality of inter modes for the candidate partitions of the individual block using a second picture of the plurality of pictures. In an embodiment, evaluating the plurality of intra modes for the candidate partitions of the individual block includes comparing the candidate partitions to intra prediction partitions generated using only original pixel samples from the first picture and evaluating the plurality of inter modes for the candidate partitions includes comparing the candidate partitions to a plurality of search partitions comprising only original pixel samples from a second picture of the plurality of pictures. In an embodiment, comparing the candidate partitions to intra prediction partitions generated using only original pixel samples from the first picture includes generating a first intra prediction partition using the only original pixel samples according to a current intra mode being evaluated for a first candidate partition and differencing the first candidate partition and the first intra prediction partition.

In an embodiment, generating the final partitioning decision further includes generating initial coding mode decisions for partitions of the individual block corresponding to the final partitioning decision based on the evaluation of the plurality of intra modes and the plurality of inter modes.

In an embodiment, the individual block is a portion of a region of the first picture and process 1000 further includes performing a flat region detection and a noisy region detection on the region, performing edge detection on the region to determine whether the region includes a detected edge, and evaluating a temporal variance of variances of the region across multiple pictures including the first picture to determine whether the region has a low variance of the variances and generating the initial coding mode decisions for the individual block comprises applying a bias, in response to the region being a flat and noisy region, the region including an edge, and the region having a low temporal variance of the variances, to one or both of an intra mode result and an inter mode result to favor selection of the inter mode result for one or more partitions of the individual block. For example, performing the flat region detection may include denoising the region and determining a variance of the denoised region is less than a first threshold and performing the noisy region detection comprises differencing the region and the denoised region and determining a variance of the difference region is greater than a second threshold, and evaluating the temporal variance of variances of the region across multiple pictures may include determining a variance of each collocated region with respect to the region across the multiple pictures, determining a variance of the variances, and determining the variance of the variances is less than a third threshold. The intra and inter mode results may include any suitable results or costs such as rate distortion costs or the like. The bias may be applied using any suitable technique or techniques such as adding a first factor to the intra mode result or multiplying a second factor and the intra mode result.

In an embodiment, a first initial coding mode decision for a first partition of the individual block is a first intra mode of the plurality of intra modes and process 1000 further includes applying, at the video encoder, a transform to a first residual partition corresponding to the first partition and the first intra mode to generate first transformed residuals, applying, at the video encoder, the transform to a second residual partition corresponding to the first partition and a second intra mode to generate second transformed residuals, determining first and second high frequency energy values for the first and second transformed residuals, discarding, in response to the second high frequency value being less than the first high frequency value, the first intra mode, and encoding, at the video encoder, the first partition using the second intra mode. The transform applied to the first and second residual partitions may be any suitable transform such as a Hadamard transform. In an embodiment, determining the first high frequency coefficient energy value comprises averaging a plurality of the first transform residual coefficients excluding a DC transform coefficient of the first transform residual coefficients.

Processing continues at operation 1003, where the final partitioning decision generated at operation 1002 is provided to a video encoder. Initial coding mode decisions may also be provided to the encoder in some embodiments. The video encoder may be any suitable video encoder. In an embodiment, the video encoder is a standards compliant video encoder.

Processing continues at operation 1004, where, at the video encoder, the individual block is differenced with a reconstructed block generated based on the final partitioning decision to generate a residual block corresponding to the individual block. For example, a standards compliant local decode loop is applied based on the final partitioning decision to generate the reconstructed block. The coding modes used to generate the reconstructed block may be the initial coding mode decisions for partitions of the individual block or the initial coding mode decisions may be modified by the encoder as discussed herein.

Processing continues at operation 1005, where the transform coefficients of the residual block are encoded into an output bitstream. The transform coefficients may be encoded using any suitable technique or techniques to generate any suitable output bitstream. In an embodiment, the output bitstream is a standards (e.g., AVC, HEVC, VP9, etc.) compliant bitstream. In an embodiment, the transform coefficients are generated by performing a forward transform and forward quantization on the residual block.

Process 1000 may be repeated any number of times either in series or in parallel for any number of input video sequences, pictures, coding units, blocks, etc. As discussed, process 1000 may provide for video encoding generating coding mode decisions using only original pixel samples or values such that the coding mode decisions are implemented by an encoder such as a standards compliant encoder.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
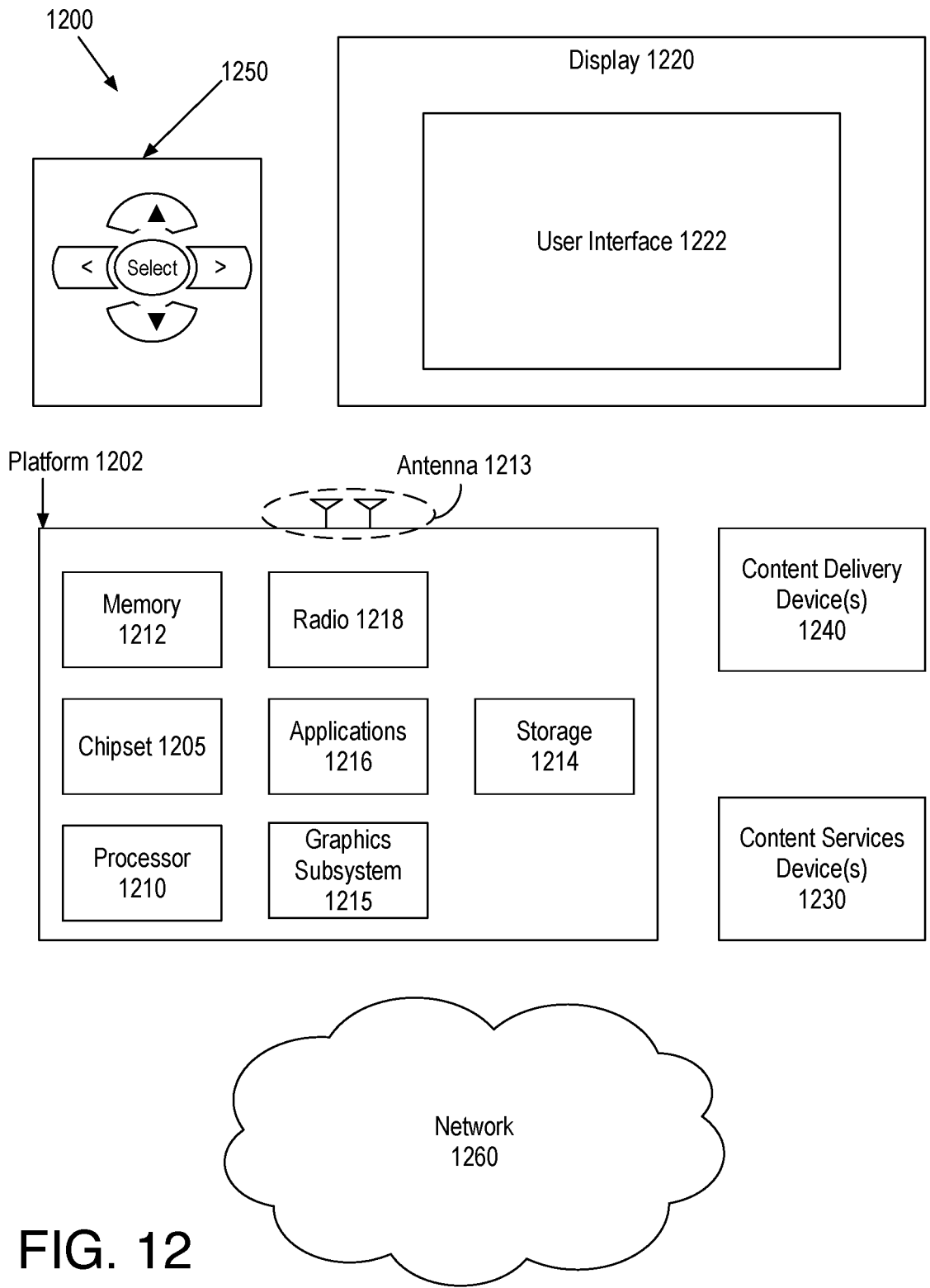
FIG. 12 is an illustrative diagram of an example system.

FIG. 12 is an illustrative diagram of an example system 1200, arranged in accordance with at least some implementations of the present disclosure. In various implementations, system 1200 may be a mobile system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of may be used to interact with user interface 1222, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1220) by movements of a pointer, cursor, focus ring, or other visual indicators displayed on the display. For example, under the control of software applications 1216, the navigation features located on navigation may be mapped to virtual navigation features displayed on user interface 1222, for example. In various embodiments, may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
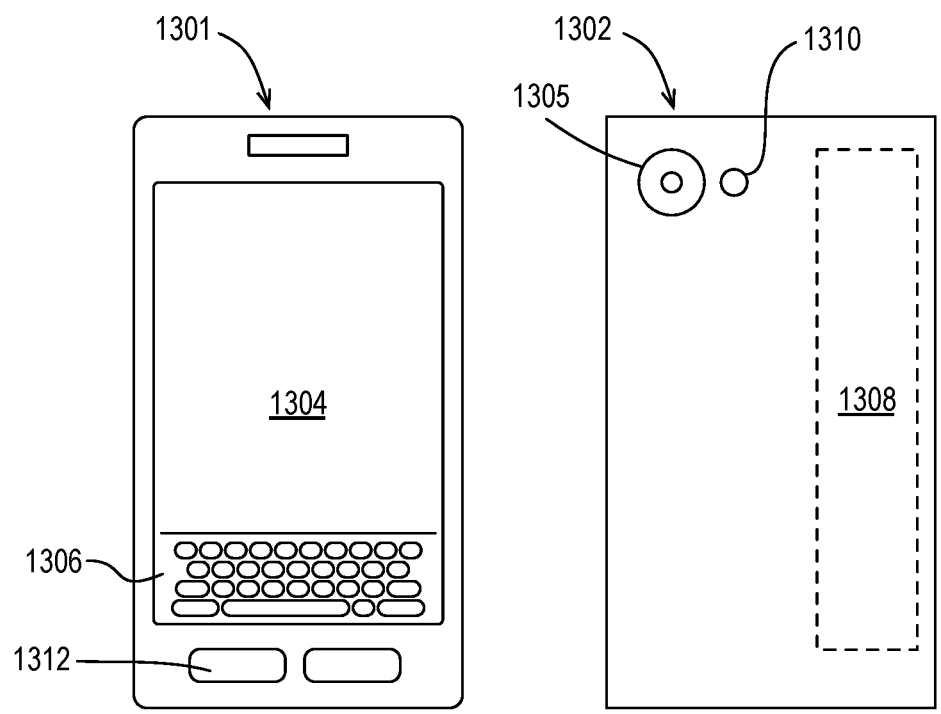
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, system 100 or portions thereof may be implemented via device 1300. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video encoding comprises receiving input video for encoding, the input video comprising a plurality of pictures, generating a final partitioning decision for an individual block of a first picture of the plurality of pictures by evaluating a plurality of intra modes for candidate partitions of the individual block by comparing the candidate partitions to intra predicted partitions generated using only original pixel samples from the first picture and evaluating a plurality of inter modes for the candidate partitions by comparing the candidate partitions to a plurality of search partitions comprising only original pixel samples from a second picture of the plurality of pictures, providing the final partitioning decision to a video encoder, differencing, at the video encoder, the individual block with a reconstructed block generated using the final partitioning decision to generate a residual block corresponding to the individual block, and encoding, at the video encoder, at least transform coefficients of the residual block into an output bitstream.

In one or more second embodiments, for any of the first embodiments, the individual block is a portion of a region of the first picture and the method further comprises performing a flat region detection and a noisy region detection on the region to determine whether the region is a flat and noisy region, performing edge detection to determine whether the region includes a detected edge, and evaluating a temporal variance of variances of the region across multiple pictures including the first picture to determine whether the region has low temporal variance of the variances such that evaluating the intra modes and inter modes comprises applying a bias, in response to the region being a flat and noisy region, the region including an edge, and the region having a low temporal variance of the variances, to one or both of an intra mode result and an inter mode result to favor selection of the inter mode result for one or more partitions of the individual block.

In one or more third embodiments, for any of the first or second embodiments, applying the bias comprises one of adding a first factor to the intra mode result or the inter mode result or multiplying a second factor and the intra mode result or the inter mode result.

In one or more fourth embodiments, for any of the first through third embodiments, the intra and inter mode results comprise rate-distortion costs.

In one or more fifth embodiments, for any of the first through fourth embodiments, performing the flat region detection comprises denoising the region and comparing a variance of the denoised region to a first threshold and performing the noisy region detection comprises differencing the region and the denoised region and comparing a variance of the difference region to a second threshold.

In one or more sixth embodiments, for any of the first through fifth embodiments, generating the final partitioning decision further comprises generating initial coding mode decisions for partitions of the individual block corresponding to the final partitioning decision based on the evaluation of the plurality of intra modes and the plurality of inter modes.

In one or more seventh embodiments, for any of the first through sixth embodiments, a first initial coding mode decision for a first partition of the individual block comprises a first intra mode of the plurality of intra modes and the method further comprises applying, at the video encoder, a transform to a first residual partition corresponding to the first partition and the first intra mode to generate first transform residual coefficients, applying, at the video encoder, the transform to a second residual partition corresponding to the first partition and a second intra mode to generate second transform residual coefficients, determining first and second high frequency coefficient energy values for the first and second transform residual coefficients, discarding, in response to the second high frequency value being less than the first high frequency value, the first intra mode, and encoding, at the video encoder, the first partition using the second intra mode.

In one or more eighth embodiments, for any of the first through seventh embodiments, determining the first high frequency coefficient energy value comprises averaging a plurality of the first transform residual coefficients excluding a DC transform coefficient of the first transform residual coefficients.

In one or more ninth embodiments, for any of the first through eighth embodiments, the reconstructed block is generated by the video encoder using the final partitioning decision and the initial coding mode decisions.

In one or more tenth embodiments, for any of the first through ninth embodiments, comparing the candidate partitions to intra prediction partitions generated using only original pixel samples from the first picture comprises generating a first intra prediction partition using only the original pixel samples according to a current intra mode being evaluated for a first candidate partition and differencing the first candidate partition and the first intra prediction partition.

In one or more eleventh embodiments, a system for video coding comprises a memory to store input video for encoding, the input video comprising a plurality of pictures, one or more first processors, and a second processor coupled to the one or more first processors and to implement a video encoder, the one or more first processors to generate a final partitioning decision for an individual block of a first picture of the plurality of pictures based on evaluation of a plurality of intra modes for candidate partitions of the individual block and evaluation of a plurality of inter modes for the candidate partitions using a second picture of the plurality of pictures, wherein the one or more first processors are to evaluate the plurality of intra modes using a comparison of the candidate partitions to intra prediction partitions generated using only original pixel samples from the first picture, and one or more first processors are to evaluate the plurality of inter modes using a comparison of the candidate partitions to a plurality of search partitions comprising only original pixel samples from a second picture of the plurality of pictures and provide the final partitioning decision to the second processor, the second processor to difference, at the video encoder, the individual block with a reconstructed block generated using the final partitioning decision to generate a residual block corresponding to the individual block and encode, at the video encoder, at least transform coefficients of the residual block into an output bitstream.

In one or more twelfth embodiments, for any of the eleventh embodiments, the individual block is a portion of a region of the first picture, and the one or more first processors are further to perform a flat region detection and a noisy region detection on the region to determine whether the region is a flat and noisy region, perform edge detection to determine whether the region includes a detected edge, and evaluate a temporal variance of variances of the region across multiple pictures including the first picture to determine whether the region has low temporal variance of the variances such that the one or more first processors to generate the initial coding mode decisions for the individual block comprises the one or more first processors to apply a bias, in response to the region being a flat and noisy region, the region including an edge, and the region having a low temporal variance of the variances, to one or both of an intra mode result and an inter mode result to favor selection of the inter mode result for one or more partitions of the individual block.

In one or more thirteenth embodiments, for any of the eleventh or twelfth embodiments, the one or more first processors to apply the bias comprises the one or more first processors to add a first factor to the intra mode result or the inter mode result or multiply a second factor and the intra mode result or the inter mode result.

In one or more fourteenth embodiments, for any of the eleventh through thirteenth embodiments, the intra and inter mode results comprise rate-distortion costs.

In one or more fifteenth embodiments, for any of the eleventh through fourteenth embodiments, the one or more first processors to perform the flat region detection comprises the one or more first processors to denoise the region and compare a variance of the denoised region to a first threshold and the one or more first processors to perform the noisy region detection comprises the one or more first processors to difference the region and the denoised region and compare a variance of the difference region to a second threshold.

In one or more sixteenth embodiments, for any of the eleventh through fifteenth embodiments, the one or more first processors to generate the final partitioning decision comprises the one or more first processors to generate initial coding mode decisions for partitions of the individual block corresponding to the final partitioning decision based on the evaluation of the plurality of intra modes and the plurality of inter modes.

In one or more seventeenth embodiments, for any of the eleventh through sixteenth embodiments, a first initial coding mode decision for a first partition of the individual block comprises a first intra mode of the plurality of intra modes, and the second processor is further to apply, at the video encoder, a transform to a first residual partition corresponding to the first partition and the first intra mode to generate first transformed residuals, apply, at the video encoder, the transform to a second residual partition corresponding to the first partition and a second intra mode to generate second transformed residuals, determine first and second high frequency energy values for the first and second transformed residuals, discard, in response to the second high frequency value being less than the first high frequency value, the first intra mode, and encode, at the video encoder, the first partition using the second intra mode.

In one or more eighteenth embodiments, for any of the eleventh through seventeenth embodiments, the second processor to determine the first high frequency coefficient energy value comprises the second processor to average a plurality of the first transform residual coefficients excluding a DC transform coefficient of the first transform residual coefficients.

In one or more nineteenth embodiments, for any of the eleventh through eighteenth embodiments, the reconstructed block is generated by the video encoder using the final partitioning decision and the initial coding mode decisions.

In one or more twentieth embodiments, for any of the eleventh through nineteenth embodiments, the comparison of the candidate partitions to intra prediction partitions generated using only original pixel samples from the first picture comprises the one or more first processors to generate a first intra prediction partition using only the original pixel and difference the first candidate partition and the first intra prediction partition.

In one or more twenty-first embodiments, at least one machine readable medium may include a plurality of instructions that in response to being executed on a computing device, causes the computing device to perform a method according to any one of the above embodiments.

In one or more twenty-second embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video encoding comprising:
   receiving non-compressed input video to be encoded and comprising a plurality of pictures having original pixel samples;
   generating a final partitioning and coding modes decision for an individual block of a first picture of the plurality of pictures by:
      evaluating a plurality of intra modes for candidate partitions of the individual block by comparing the candidate partitions to intra predicted partitions generated using only original pixel samples from the first picture without using any reconstructed reference pixels;
      evaluating a plurality of inter modes for the candidate partitions by comparing the candidate partitions to a plurality of search partitions comprising only original pixel samples from a second picture of the plurality of pictures without using any reconstructed reference pixels; and
      determining a final partitioning decision for the individual block and coding modes for each partition of the final partitioning based on evaluation of the intra and inter modes, wherein a first coding mode for a first partition of the individual block is a first intra coding mode of the plurality of intra modes;
   providing the final partitioning decision to a video encoder;
   applying a transform to a first residual partition comprising a difference between the first partition and a first reconstructed partition generated using the first intra mode to generate first transform residual coefficients and applying the transform to a second residual partition comprising a difference between the first partition and a second reconstructed partition generated using the second intra mode to generate second transform residual coefficients;
   determining first and second high frequency coefficient energy values representative of the first and second transform residual coefficients using only high frequency transform residual coefficients of the first and second transform residual coefficients, respectively;
   selecting a final intra mode for the first partition as the one of the first intra mode or the second intra mode having a lower high frequency coefficient energy value;
   differencing, at the video encoder, the individual block with a reconstructed block generated using the final partitioning decision and the selected final intra mode for the first partition to generate a residual block corresponding to the individual block without performing prediction mode selection; and
   encoding, at the video encoder, at least transform coefficients of the residual block into an output bitstream.

2. The method of claim 1, wherein the individual block is a portion of a region of the first picture, the method further comprising:
   performing a flat region detection and a noisy region detection on the region to determine whether the region is a flat and noisy region;
   performing edge detection to determine whether the region includes a detected edge; and
   evaluating a temporal variance of variances of the region across multiple pictures including the first picture to determine whether the region has low temporal variance of the variances,
   wherein evaluating the intra modes and inter modes comprises applying a bias, in response to the region being a flat and noisy region, the region including an edge, and the region having a low temporal variance of the variances, to one or both of an intra mode result and an inter mode result to favor selection of the inter mode result for one or more partitions of the individual block.

3. The method of claim 2, wherein applying the bias comprises one of adding a first factor to the intra mode result or the inter mode result or multiplying a second factor and the intra mode result or the inter mode result.

4. The method of claim 2, wherein the intra and inter mode results comprise rate-distortion costs.

5. The method of claim 2, wherein performing the flat region detection comprises denoising the region and comparing a variance of the denoised region to a first threshold and performing the noisy region detection comprises differencing the region and the denoised region and comparing a variance of the difference region to a second threshold.

6. The method of claim 1, wherein the transform comprises a Hadamard transform.

7. The method of claim 1, wherein the first transform residual coefficients comprises 16×16 first transform residual coefficients and the first high frequency coefficient energy value comprises an average of a bottom right group of 4×4 transform residual coefficients from the 16×16 first transform residual coefficients.

8. The method of claim 1, wherein the first high frequency coefficient energy value comprises an average of a plurality of the first transform residual coefficients excluding a DC transform coefficient of the first transform residual coefficients.

9. The method of claim 1, wherein the reconstructed block is generated by the video encoder using the final partitioning decision and the initial coding mode decisions.

10. The method of claim 1, wherein comparing the candidate partitions to intra prediction partitions generated using only original pixel samples from the first picture comprises:
generating a first intra prediction partition using only the original pixel samples according to a current intra mode being evaluated for a first candidate partition; and
differencing the first candidate partition and the first intra prediction partition.

11. A system for video coding comprising:
a memory to store non-compressed input video to be encoded and comprising a plurality of pictures having original pixel samples;
one or more first processors; and
a second processor coupled to the one or more first processors and to implement a video encoder, the one or more first processors to:
generate a final partitioning and coding modes decision for an individual block of a first picture of the plurality of pictures based on evaluation of a plurality of intra modes for candidate partitions of the individual block and evaluation of a plurality of inter modes for the candidate partitions using a second picture of the plurality of pictures, wherein the one or more first processors are to evaluate the plurality of intra modes using a comparison of the candidate partitions to intra prediction partitions generated using only original pixel samples from the first picture without using any reconstructed reference pixels, to evaluate the plurality of inter modes using a comparison of the candidate partitions to a plurality of search partitions comprising only original pixel samples from a second picture of the plurality of pictures without using any reconstructed reference pixels, to determine a final partitioning decision for the individual block and coding modes for each partition of the final partitioning based on evaluation of the intra and inter modes, wherein a first coding mode for a first partition of the individual block is a first intra coding mode of the plurality of intra modes,
provide the final partitioning decision to the second processor,
the second processor to:
apply a transform to a first residual partition comprising a difference between the first partition and a first reconstructed partition generated using the first intra mode to generate first transform residual coefficients and applying the transform to a second residual partition comprising a difference between the first partition and a second reconstructed partition generated using the second intra mode to generate second transform residual coefficients,
determine first and second high frequency coefficient energy values representative of the first and second transform residual coefficients using only high frequency transform residual coefficients of the first and second transform residual coefficients, respectively, and
select a final intra mode for the first partition as the one of the first intra mode or the second intra mode having a lower high frequency coefficient energy value,
difference, at the video encoder, the individual block with a reconstructed block generated using the final partitioning decision and the selected final intra mode for the first partition to generate a residual block corresponding to the individual block; and
encode, at the video encoder, at least transform coefficients of the residual block into an output bitstream.

12. The system of claim 11, wherein the individual block is a portion of a region of the first picture, and the one or more first processors are further to:
perform a flat region detection and a noisy region detection on the region to determine whether the region is a flat and noisy region;
perform edge detection to determine whether the region includes a detected edge; and
evaluate a temporal variance of variances of the region across multiple pictures including the first picture to determine whether the region has low temporal variance of the variances,
wherein the one or more first processors to generate the initial coding mode decisions for the individual block comprises the one or more first processors to apply a bias, in response to the region being a flat and noisy region, the region including an edge, and the region having a low temporal variance of the variances, to one or both of an intra mode result and an inter mode result to favor selection of the inter mode result for one or more partitions of the individual block.

13. The system of claim 12, wherein the one or more first processors to apply the bias comprises the one or more first processors to add a first factor to the intra mode result or the inter mode result or multiply a second factor and the intra mode result or the inter mode result.

14. The system of claim 13, wherein the one or more first processors to perform the flat region detection comprises the one or more first processors to denoise the region and compare a variance of the denoised region to a first threshold and the one or more first processors to perform the noisy region detection comprises the one or more first processors to difference the region and the denoised region and compare a variance of the difference region to a second threshold.

15. The system of claim 11, wherein the transform comprises a Hadamard transform.

16. The system of claim 11, wherein the first transform residual coefficients comprises 16×16 first transform residual coefficients and the first high frequency coefficient energy value comprises an average of a bottom right group of 4×4 transform residual coefficients from the 16×16 first transform residual coefficients.

17. The system of claim 11, wherein the first high frequency coefficient energy value comprises an average of a plurality of the first transform residual coefficients excluding a DC transform coefficient of the first transform residual coefficients.

18. At least one non-transitory machine readable medium comprising a plurality of instructions that, in response to being executed on a computing device, cause the computing device to perform video coding by:
receiving non-compressed input video to be encoded and comprising a plurality of pictures having original pixel samples;
generating a final partitioning and coding modes decision for an individual block of a first picture of the plurality of pictures by:
evaluating a plurality of intra modes for candidate partitions of the individual block by comparing the candidate partitions to intra predicted partitions generated using only original pixel samples from the first picture without using any reconstructed reference pixels;
evaluating a plurality of inter modes for the candidate partitions by comparing the candidate partitions to a plurality of search partitions comprising only original pixel samples from a second picture of the plurality of pictures without using any reconstructed reference pixels; and
determining a final partitioning decision for the individual block and coding modes for each partition of the final partitioning based on evaluation of the intra and inter modes, wherein a first coding mode for a first partition of the individual block is a first intra coding mode of the plurality of intra modes;
providing the final partitioning decision to a video encoder;
applying a transform to a first residual partition comprising a difference between the first partition and a first reconstructed partition generated using the first intra mode to generate first transform residual coefficients and applying the transform to a second residual partition comprising a difference between the first partition and a second reconstructed partition generated using the second intra mode to generate second transform residual coefficients;
determining first and second high frequency coefficient energy values representative of the first and second transform residual coefficients using only high frequency transform residual coefficients of the first and second transform residual coefficients, respectively;
selecting a final intra mode for the first partition as the one of the first intra mode or the second intra mode having a lower high frequency coefficient energy value;
differencing, at the video encoder, the individual block with a reconstructed block generated using the final partitioning decision and the selected final intra mode for the first partition to generate a residual block corresponding to the individual block without performing prediction mode selection; and
encoding, at the video encoder, at least transform coefficients of the residual block into an output bitstream.

19. The machine readable medium of claim 18, wherein the individual block is a portion of a region of the first picture, the machine readable medium comprising further instructions that, in response to being executed on the device, cause the device to perform video coding by:
performing a flat region detection and a noisy region detection on the region to determine whether the region is a flat and noisy region;
performing edge detection to determine whether the region includes a detected edge; and
evaluating a temporal variance of variances of the region across multiple pictures including the first picture to determine whether the region has low temporal variance of the variances,
wherein evaluating the intra modes and inter modes comprises applying a bias, in response to the region being a flat and noisy region, the region including an edge, and the region having a low temporal variance of the variances, to one or both of an intra mode result and an inter mode result to favor selection of the inter mode result for one or more partitions of the individual block.

20. The machine readable medium of claim 19, wherein applying the bias comprises one of adding a first factor to the intra mode result or the inter mode result or multiplying a second factor and the intra mode result or the inter mode result.

21. The machine readable medium of claim 18, wherein performing the flat region detection comprises denoising the region and comparing a variance of the denoised region to a first threshold and performing the noisy region detection comprises differencing the region and the denoised region and comparing a variance of the difference region to a second threshold.

22. The machine readable medium of claim 18, wherein the transform comprises a Hadamard transform.

23. The machine readable medium of claim 18, wherein the first transform residual coefficients comprises 16×16 first transform residual coefficients and the first high frequency coefficient energy value comprises an average of a bottom right group of 4×4 transform residual coefficients from the 16×16 first transform residual coefficients.

24. The machine readable medium of claim 18, wherein the first high frequency coefficient energy value comprises an average of a plurality of the first transform residual coefficients excluding a DC transform coefficient of the first transform residual coefficients.

* * * * *